United States Patent Office 3,388,118
Patented June 11, 1968

3,388,118
CHEMICAL MODIFICATION OF CELLULOSE AND PRODUCTS THEREOF
Giuliana C. Tesoro, Dobbs Ferry, N.Y., assignor to J. P. Stevens & Co., Inc., New York, N.Y., a corporation of Delaware
No Drawing. Filed Apr. 23, 1965, Ser. No. 450,526
17 Claims. (Cl. 260—212)

ABSTRACT OF THE DISCLOSURE

A method of modifying cellulose with selective modifying reagents in the class of trialkyl phosphites, ammonia, hydrazine, diamines, halides, hydrophobic polyamines, bismercaptans, alkali metal sulfides, disulfides and polysulfides, thiourea, tertiary amines and hydrophobic mercaptans, comprising reacting such reagents at elevated temperatures with a cellulose polymer which has been previously modified so as to have the structure

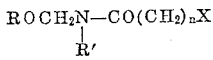

where R and R' are selected from the group consisting of hydrogen, lower alkyl, alkoxymethyl, and hydroxymethyl, X is selected from the group consisting of chlorine, bromine and iodine, and $n$ is an integer of from 1 to 5.

---

The present invention relates to a method of modifying a material comprising cellulose polymers, and to the material so modified. More particularly, the present invention relates to a method of modifying halogen-containing cellulose polymers to impart specific desirable properties.

It is a desirable objective to modify cellulose to impart specific functional properties. A major drawback to such modification is that cellulose is relatively inert and it is therefore difficult to chemically modify the polymer.

There have been various proposals concerning chemical modification of cellulose to provide a more reactive form, which, in turn, could be useful as an intermediate for preparing the various end products. However, there has always been a problem that the preparation of the intermediate often has a deleterious effect on the properties of the cellulose itself so that the end product is necessarily inferior in quality.

In view of the foregoing, it is an object of the present invention to provide a method for modifying halogen-containing cellulose to impart specific properties.

It is a further object of the present invention to provide a method for treating halogen-containing cellulose to impart flame-retardant properties.

It is another object of the present invention to provide a method for modifying halogen-containing cellulose to impart water-repellant properties.

It is an additional object of the present invention to provide a method for modifying halogen-containing cellulose to impart improved resilience.

It is another object of the present invention to use as an intermediate a halogen-containing cellulose prepared in a manner which minimizes destruction of the cellulose polymers.

It is another object of the present invention to provide a method of improving the reacting of halogen-containing cellulose by preferential substitution of one halogen species for another.

Halogen-containing cellulose is preferably prepared by treating the cellulose with compounds having the following generic formula:

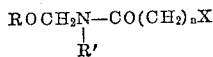 (1)

in which R and R' are selected from the group consisting of hydrogen, lower alkyl, hydroxymethyl and alkoxymethyl; X is halogen (chlorine, bromine, iodine) and $n$ is an integer having a value of 1 to 5; in the presence of an acidic or acid forming catalyst. The reaction which takes place when cellulose polymers are treated with the compounds of Formula 1 can be schematically represented by Equation 2, where the symbol Cell-OH is used to represent a cellulose molecule:

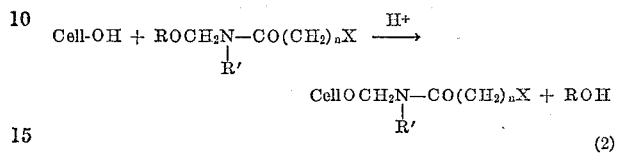

(2)

Compounds of Formula 1 in which $n=1$ are preferred, since they have more desirable solubility and reactivity than those in which $n$ is substantially more than 1.

Introduction of halogen by Reaction 2 shown above, is advantageous because the cellulose polymer is not degraded as it would be if thionyl chloride, for example, were used. However, it is to be understood that the reactions discussed herein for the treatment of halogen- containing cellulose are not limited to such intermediate produced by Reaction 2. Any cellulose containing reactive halogen is suitable for use in accordance with the methods of the present invention.

The compounds of Formula 1 can be prepared by known methods, generally by the reaction of formaldehyde with suitable halo-substituted carboxamides. For example, the reaction of formaldehyde with chloro-acetamide yields a product of the formula:

$$\text{HOCH}_2\text{NHCOCH}_2\text{Cl} \qquad (3)$$

Product 3 is a species of the generic compounds represented by Formula 1 in which R and R' are hydrogen, $n=1$ and X=chlorine. Other compounds representative of Formula 1 can be prepared by similar methods.

The reaction of the compounds of Formula 1 with cellulose, exemplified by Equation 2, is catalyzed by acidic compounds, and by compounds capable of liberating protons on heating. Suitable catalysts are water-soluble, non-volatile organic acids such as oxalic, citric, tartaric acid and the like; salts of mineral acids with ammonia and amines such as amine hydrochlorides, ammonium nitrate and the like, and salts of mineral acids with bivalent metals such as magnesium, zinc, calcium and the like. The choice of catalyst is not critical, and any acid or acid-forming substance can be employed. Free mineral acids are preferably avoided because, although they are effective in catalyzing the desired reaction, they have a tendency to degrade the cellulose under the conditions of reaction.

The reaction of the cellulose with the compounds of Formula 1 is conducted by contacting the cellulose with a solution containing the reagent and catalyst, drying, and subsequently heating for a brief period to drive the reaction to substantial completion. In the case of textile cellulose, the treatment is conveniently carried out by padding the textile with the reagent-catalyst solution, driving off the solvent by drying in a forced draft oven and then heating or curing to complete the reaction. Preferably, water should be used as the solvent since this simplifies the padding operation and minimizes handling problems.

The heating or curing step can be carried out by any convenient means. The time and temperature of heating can be varied over a broad range and depend on the particular catalyst and catalyst concentration used. Longer times should be used with lower temperatures. In general, reaction times of about 2 to 20 minutes at about 110° C. to 175° C. are sufficient. After the heating step, the treated cellulose can be washed to remove unreacted reagent and catalyst. Chemical analysis of the reaction product may be conducted to establish (1) the halogen content, (2) the nitrogen content, and (3) the methylene (bound formaldehyde) content The preferred product contains one atom of halogen for each nitrogen and for each methylene ether group introduced.

Modified cellulose containing 0.1 to 1.0 meq./g. milliequivalents per gram) of halogen can easily be obtained by this procedure. If higher halogen is desired, it can be obtained by repeating the treatment until the desired halogen content is reached.

The process outlined above can be carried out on cellulose in the form of film, fiber, yarn, woven or knitted fabric or non-woven structures. The treatment is applicable to the modification of natural cellulose, such as cotton, linen, wood, and of regenerated cellulose such as rayon. It is particularly useful for the modification of commonly used textile celluloses, including cotton and regenerated cellulose fabrics. In addition, a material composed in part of cellulose can also be treated in accordance with the inventive process.

Set forth below are examples which illustrate the manner in which halogen is introduced into cellulose. The test procedures referred to in the examples are identified as follows:

Formaldehyde—J. Pol. Sci. 5, 734 (1961).
Halogen—Saponification in 1 N KOH in ethylene glycol for two hours at reflux temperature, followed by conductometric titration with standard $AgNO_3$ using Ag/AgCl electrodes.
Crease Recovery—ASTM-D-1295-60T (in degrees).
Tensile Strength—Ravel Strip Method ASTM-D-1682-59T (lbs.).
Tear Strength—ASTM-D-1424-63 (lbs.).

Porportions and percentages are by weight unless otherwise noted.

EXAMPLE 1

Samples of plain weave cotton fabric (commonly known as 80 x 80 print cloth) were conditioned at 65% relative humidity at a temperature of 21° C., and weighed on an analytical balance. They were then treated with aqueous solutions of N-methylol-chloroacetamide $$(HOCH_2NHCOCH_2Cl)$$

containing various types and amounts of catalysts, using a laboratory padder and setting the rolls at such a pressure as to give a 100% wet pickup, by weight. The fabric samples so treated were framed to the original dimensions and dried at 60° C., then cured in a forced draft oven, as indicated below. The cured samples were rinsed thoroughly in a non-ionic detergent solution at 60° C., then in water and finally dried on frames. The dried samples were again conditioned as above, and the weight increase due to the treatment calculated. The following results were obtained:

| Sample | Percent Reagent Applied, OWF+ | Percent Catalyst added to reag. solution | Curing Time in Min. at 150° C. | Percent Weight Increase | Percent Yield |
|---|---|---|---|---|---|
| A-1 | 18.6 | 1% XRF [1] | 2 | 6.8 | 43 |
| A-2 | 18.6 | 1% XRF [1] | 5 | 8.6 | 54 |
| B-1 | 15.2 | 3% XRF [1] | 5 | 6.0 | 46 |
| B-2 | 15.0 | 3% XRF [1] | 15 | 6.25 | 49 |
| C-1 | 19.2 | 3 MX [2] | 2 | 7.0 | 43 |
| C-2 | 19.2 | 3 MX | 5 | 9.0 | 55 |
| E-1 | 18.8 | 1 Citric Acid | 2 | 6.5 | 40 |
| E-2 | 18.8 | 1 Citric Acid | 5 | 9.1 | 57 |

[1] Catalyst XRF—Product of Onyx Chemical Co. (Jersey City, N.J.) (amine hydrochloride solution).
[2] Accelerator MX—Product of American Cyanamid Co. (magnesium chloride solution).
+ On weight of Fabric Treated.

The analysis of samples B–1 and B–2 gave the following results:

| Sample | Percent Cl | | Percent N | | Percent HCHO | | Cl Ratio HCHO | |
|---|---|---|---|---|---|---|---|---|
| | Found | Calcd. fr. w.g. | Found | Calcd. fr. w.g. | Found | Calcd. fr. w.g. | Found | Calcd. |
| B-1 | 2.12 | 1.91 | 1.01 | 0.75 | 1.71 | 1.61 | 1.24 | 1.18 |
| B-2 | 1.82 | 1.98 | 0.91 | 0.78 | 1.57 | 1.67 | 1.16 | 1.18 |

EXAMPLE 2

Example 1 was repeated, but instead of the plain weave cotton fabric (commonly known as 80 x 80 print cloth) a 100% cotton twist twill (weight 8 oz./square yard) fabric, dyed with vat dyestuffs, was used. The following were obtained:

| Sample | Percent Reagent Applied, OWF | Catalyst OWB, Percent | Curing Time in Min. at 150° C. | Percent Weight Increase | Percent Yield |
|---|---|---|---|---|---|
| A-1 | 16.7 | [1] 3 | 5 | 5.8 | 41 |
| A-2 | 16.7 | [1] 3 | 15 | 8.0 | 56 |
| C-1 | 17.7 | [1] 3 | 5 | 6.5 | 43 |
| C-2 | 17.7 | [1] 3 | 15 | 7.6 | 50 |

[1] XRF.

Analytical data on the treated samples were as follows:

| Sample | Percent Cl | | Percent N | | Percent HCHO | | Cl/N Ratio | | Cl/HCHO Ratio | |
|---|---|---|---|---|---|---|---|---|---|---|
| | Found | Calcd. fr. w.g. | Found | Calcd. fr. w.g. | Found | Calcd. fr. w.g. | Found | Calcd. | Found | Calcd. |
| A-2 | 2.90 | 2.51 | 1.29 | 0.99 | 1.98 | 2.12 | 2.25 | 2.54 | 1.46 | 1.18 |
| C-2 | 2.38 | 2.39 | | | 1.73 | 2.02 | | | 1.37 | 1.18 |

EXAMPLE 3

Example 1 was repeated, but instead of N-methylol chloroacetamide, the corresponding methyl ether, N-methoxymethyl chloroacetamine was used in the presence of a mixed catalyst (2% citric acid and 2% Accelerator MX) under the curing conditions specified below:

| Sample | Percent Reactant Applied, OWF | Curing Temperature ° C. (time, 2 minutes) | Percent Weight Increase | Percent Yield |
|---|---|---|---|---|
| A-1 | 23.6 | 95 | 4.5 | 28 |
| A-2 | 23.6 | 105 | 6.2 | 39 |

The properties of the treated samples were as follows:

| Sample | CR (W+F) Dry | CR (W+F) Wet | Tensile Strength W | Tear Strength W |
|---|---|---|---|---|
| A-1 | 192 | 205 | 45 | 1.3 |
| A-2 | 192 | 227 | 42 | 1.3 |
| Untreated Control | 150 | 160 | 60 | 1.8 |

The treated samples exhibited an increase in crease recovery over that of the untreated control by virtue of the formation of formaldehyde from the N-methoxymethyl chloroacetamide, which formaldehyde reacted with the cellulose to cause cross-linking.

The modified cellulose obtained according to the present invention has useful and desirable properties. The presence of the halogen imparts a broad range of reactivity that will be more fully discussed and illustrated below. In spite of this reactivity, however, the halogen-modified cellulose is a very stable compound under all commonly encountered conditions of storage. This property is especially important whenever it is desired, for example, to treat the cellulose in the form of fiber or yarn, convert the halogen-containing modified cellulose to a manufactured product such as a fabric or even a garment, and then carry out a further modification, such as cross-linking.

The reactivity of the halogen in the modified cellulose makes further modification possible for the purpose of imparting specific functional properties to the cellulose. Typical examples of these further modifications are discussed below, and illustrated by the examples.

the stable phosphonate grouping in the cellulose molecule. The reaction of Equation 3 is preferably conducted at an elevated temperature above about 100° C. and an excess of trialkyl phosphite is generally used. The reaction requires prolonged heating, and can be conveniently carried out by immersing the halogen-modified cellulose in a solution of the phosphite, and heating the solution by any suitable means.

Example 4, below, illustrates the reaction of Equation 3 and shows the improvement in flame-retarding properties obtained by such treatment.

EXAMPLE 4

Chloroacetamido methyl cellulose (CAMC) samples which were prepared by reacting N-methylol-chloroacetamide with cotton twill (weight: 8 oz./square yard) in the presence of 3% XRF catalyst and cured at 150° C. for 15 minutes according to the procedure described in Example 1 were treated with various trialkyl-phosphites. Each of the trialkyl-phosphites was dissolved in dimethylformamide to produce a solution 25% by weight of the phosphites. Respective samples (approximate weight: 20 g.) were immersed into 600 g. of each of the trialkyl phosphite solutions. After 3 hours of reaction at a reflux temperature of about 150° C., the treated samples were thoroughly rinsed in dimethylformamide, and then rinsed in water and finally dried on frames in a forced draft oven.

Analysis of CAMC samples before treatment:

Chlorine, percent _____ 2.3
  Meq./g. _____ 0.65
Nitrogen, percent _____ 1.02
  Meq./g. _____ 0.73
Formaldehyde, percent _____ 2.02
  Meq./g. _____ 0.67

Analysis of CAMC samples after treatment with the trialkylphosphites:

| Reagent | Percent N Found | Percent P Found | Mequ./g. | Resid. Cl content, mequ./g. | Percent Yield in reaction w. phosphite |
|---|---|---|---|---|---|
| Trimethyl phosphite | 1.13 | 2.07 | 0.66 | 0.1 | ca. 100 |
| Triethyl phosphite | 1.13 | 1.35 | 0.44 | 0.1 | 66 |
| Tributyl phosphite | 1.01 | 0.81 | 0.26 | 0.1 | 47 |
| Triallyl phosphite | 1.16 | 1.24 | 0.4 | 0.15 | 61 |

The reaction with trialkyl phosphites to obtain cellulose amido-phosphonates having durable flame retardant properties is represented by Equation 3:

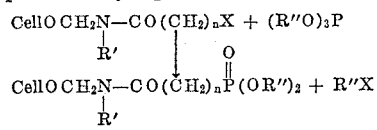

(3)

In Equation 3, R″ represents an alkyl or alkenyl radical. The phosphorus-containing modified cellulose products obtained in the manner shown in Equation 3 exhibit durable flame-retardant properties due to the presence of The samples treated with trimethyl and triethyl phosphite were exposed to alkaline scouring (2.0% $Na_2CO_3$, 0.5% Igepon T-73, 95° C. 1 hour, 1:30 fabric-liquor ratio) in order to test the stability of the phosphonates.

The analyses and the flame test after the scouring specified above gave the following results:

| Reagent | Percent N Found | Percent N Retained | Percent P Found | Percent P Retained | Char Length in Vert. Flame Test (inches)* |
|---|---|---|---|---|---|
| Trimethylphosphite | 1.11 | 98 | 2.10 | 100 | 5.0 |
| Triethylphosphite | 1.11 | 98 | 1.34 | 100 | 6.3 |

*Vertical Flame Resistance Test—AATCC-34-1952.

The halogen-containing cellulose, made in accordance with the present invention may be reacted with compounds to introduce hydrophobic groups and thereby impart water repellency. Thus, for example, reactions with amines or mercaptans are represented by Equations 4 and 5, respectively:

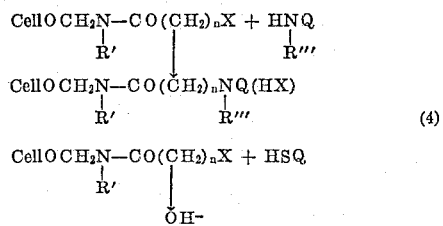

(4)

Analysis and properties of CAMC samples before treatment with amines:

| | |
|---|---|
| Percent weight gain | 4.6 |
| Percent Cl, found | 1.80 |
| Calcd. from w.g. | 1.52 |
| Percent N, found | 0.64 |
| Calcd. from w.g. | 0.58 |
| Percent HCO, found | 1.49 |
| Calcd. from w.g. | 1.25 |
| Cl/HCHO ratio, found | 1.21 |
| Calcd. from w.g. | 1.18 |

| Diamine Reagent | Solvent | Conc. of Amine Solution (g./l.) | Percent Weight Change | Percent Cl Retained | Crease Recovery (W+F) | |
|---|---|---|---|---|---|---|
| | | | | | Dry | Wet |
| None | | | | | 238 | 224 |
| Di(methoxyethyl) amine | Dioxane | 12 | 1.5 w.g. | 40 | 250 | 237 |
| N,N'-dimethyl ethylene diamine | do | 8 | None | 60 | 260 | 248 |
| Piperazine | do | 12 | 1 w.g. | 80 | 241 | 236 |

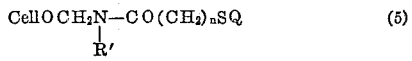

(5)

In Equations 4 and 5, $R'''$ represents hydrogen or lower alkyl and Q represents a hydrophobic monovalent radical capable of imparting water repellent properties. Q may be an aliphatic radical, a fluorinated hydrocarbon radical or a silicon-containing hydrocarbon radical.

The halogen-containing cellulose may be cross-linked by treatment with ammonia, hydrazine, or polyamine compounds to improve resilience. In the instance where the cellulose is in fabric form, increased crease recovery results. Equations 6 and 7 typify this modification:

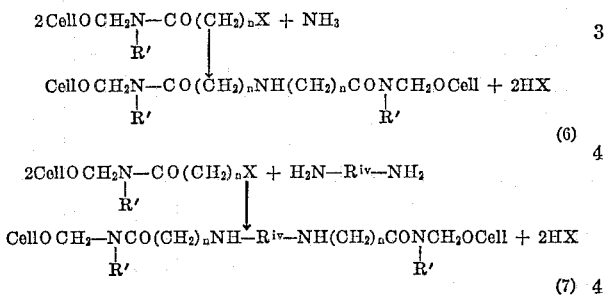

(6)

(7)

In Equation 7 $R^{iv}$ represents a divalent organic radical; a bis-secondary amine can be used in place of the bis-primary amine shown.

Example 5, set forth below, illustrates this type of further modification of halogen-containing cellulose.

EXAMPLE 5

Chloroacetamidomethyl cellulose (CAMC) samples, which were prepared by reacting N-methylol chloroacetamide with 80 × 80 cotton in the presence of 3% XRF catalyst and cured at 150° C. for 5 minutes according to the procedure described in Example 1, and which had the analyses and properties specified below, were treated with selected amines. The amines were dissolved in organic solvents and the halogenated fabric (CAMC) samples (approximate weight: 14 g. per sample) were immersed into 500 ml. of respective reagent solutions. After 12 hours' immersion in the refluxing amine solution, the samples were thoroughly rinsed in solvent and then rinsed in water. The weight change was determined as specified in Example 1. The following results were obtained:

Significant crease recovery improvements due to cross-linking are noted.

Halogen-containing cellulose may also be reacted with alkali sulfide, disulfide or polysulfide to obtain the corresponding cross-linked thioether, cross-linked disulfide or cross-linked polysulfide. Example 6, set forth below, is illustrative of this embodiment of the invention.

EXAMPLE 6

Chloroacetamido methyl cellulose (CAMC) samples (analysis and properties specified in Example 5) were treated with aqueous sodium sulfide and sodium disulfide solutions using a laboratory padder and setting the rolls at such a pressure as to give 100% wet pickup. The samples so treated were framed to original dimensions, dried and cured in a forced draft oven at 150° C. for 5 minutes, or steamed in a laboratory steamer for 30 minutes. After curing or steaming, the samples were rinsed in dilute acidic acid solution and washed thoroughly in nonionic detergent solution at 60–70° C. Finally, the samples were dried on frames. The following results were obtained:

| Reagent | Percent Reagent OWF | Reaction Conditions | Percent S Found | Crease Recovery(W+F) | |
|---|---|---|---|---|---|
| | | | | Dry | Wet |
| Na₂S | 9 | Cure: 150° C., 5 Min. | 1.13 | 216 | 245 |
| Na₂S | 6 | Steam: 30 Min. | 0.63 | 208 | 245 |
| Na₂S₂ | 15 | Cure: 150° C., 5 Min. | 1.18 | 260 | 253 |
| Na₂S₂ | 10 | Steam: 30 Min. | 0.48 | 229 | 250 |
| None | | | | 238 | 224 |

Reactions of halogen-containing cellulose with bis-mercapto compounds to obtain cross-linked cellulose having improved resilience, is illustrated by Equation 8:

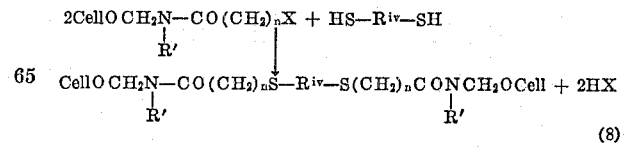

(8)

Among other reactions to which the halogen-containing cellulose can be subjected to obtain selected modified products are the following:

(a) Reaction with thiourea to obtain the isothiuronium halide, and further the corresponding mercaptan and disulfide:

$$\text{CellOCH}_2\underset{R'}{N}-CO(CH_2)_nX + H_2N\overset{SH}{C}=NH$$

$$[\text{CellOCH}_2\underset{R'}{N}-CO(CH_2)_n\overset{+}{S}\ C(NH_2)_2]X^- \quad (9)$$

$$\downarrow \text{NaOH}$$

$$\text{CellOCH}_2\underset{R'}{N}-CO(CH_2)_nSH + (NH_2)_2CO + NaX \quad (10)$$

(b) Reaction with tertiary amines to obtain a modified cellulose containing quaternary ammonium groups:

$$\text{CellOCH}_2\underset{R'}{N}-CO(CH_2)_nX + N\diagdown\overset{R}{\underset{R}{-R}}$$

$$\left(\text{CellOCH}_2\underset{R'}{N}-CO(CH_2)_n\overset{+}{N}\diagdown\overset{R}{\underset{R}{-R}}\right)X^- \quad (11)$$

The nature of the particular halogen atom X affects the reactivity of the cellulose derivative in the expected manner, with reactivity generally increasing in the order of I>Br>Cl. When the reaction of the chlorine containing cellulose does not proceed at a satisfactory rate, it is possible to replace the chlorine with a more reactive halogen even after the halogenated cellulose derivative has been prepared and isolated, by treating the chloro alkylamidomethyl cellulose with alkali iodide, as shown in Example 7 below:

EXAMPLE 7

Chloroacetamido methyl cellulose sample obtained by reacting cotton samples with N-methylol-chloroacetamide according to the procedure described in Example 1 (Sample A: 80 x 80 print cloth, Cl content 1.75%, 0.49 meq./g., fabric and Sample B: twist twill, Cl content 2.31%, 0.65 meq./g., fabric) were treated with an excess of KI dissolved in acetone. The samples (approximate weight 25 g.) were immersed into 1400 ml. of 10 g./l. KI solution. After a reaction time of 8 hours at reflux temperature, the samples were thoroughly rinsed in acetone, then in water and dried on frames in a forced draft oven.

| Sample | Percent Weight/ Increase | mequ./q. | Iodine mequ./g. | Total Halogen, mequ./q. | Percent Conversion to Iodo Derivative |
|---|---|---|---|---|---|
| A | 3.1 | 0.11 | 0.33 | 0.44 | 67 |
| B | 4.1 | 0.24 | 0.38 | 0.62 | 58 |

It is evident from the above discussion that the halogen-containing cellulose of the present invention is a useful intermediate for many diverse reactions in which unmodified cellulose would be essentially inert. The reactions illustrated by Equations 4 through 8 are preferably conducted by impregnating the halogen-containing cellulose with a solution of the desired reagent, drying the cellulose to eliminate the solvent and heating to drive the reaction to completion. In general, reaction temperatures of the order of 125° C., to 175° C. are sufficient, the time at which the cellulose is maintained at such temperature being selected to provide the desired extent of reaction.

Examples 1 through 3, set forth above, involve the use of water as the solvent for the halogen-containing reaction compound utilized in accordance with this invention to introduce halogen into cellulose polymers. As indicated, water is preferred because it is inexpensive and does not introduce any handling complications. However, other organic solvents can also be used for the preparation of the halogen containing cellulose either alone or in mixtures with water. It is preferable to use polar solvents such as methanol, ethanol, dimethylformamide, dioxane, tetrahydrofuran, acetone and the like. Solvents which do not swell the cellulose and do not dissolve appreciable amounts of the required acidic catalyst (e.g., hydrocarbon solvents) are not suitable alone but can be used in mixtures with other solvents, if desired.

The concentration of reagent in the solution used to impregnate the cellulose depends on the extent of reaction required. Generally, solutions containing 3 to 30% of the reagent selected can be applied conveniently. As suggested above, repeated treatments can be used if a higher degree of modification of the cellulose is needed. The concentration of acidic catalyst can vary within wide limits depending on the acidity and effectiveness of the catalyst and on the concentration of reagent. Amounts of 1% to 8% based on the weight of solution are preferred.

It is to be appreciated that the examples set forth above are intended to be merely illustrative and variations therein may be made by one skilled in the art without departing from the spirit and scope of this invention.

What is claimed is:

1. A process comprising the steps of providing cellulose polymers which have been modified by reaction with a compound having the formula:

$$\text{ROCH}_2\underset{R'}{N}-CO(CH_2)_nX$$

in which R and R' are selected from the group consisting of hydrogen, lower alkyl, hydroxymethyl and alkoxymethyl, X is selected from the group consisting of chlorine, bromine and iodine, and n is an integer in the range of from 1 to 5, to introduce reactive halogen, and reacting the modified cellulose polymers at a temperature above about 100° C. with a trialkyl phosphite having the formula:

$$(R''O)_3P$$

in which R'' is selected from the group of alkyl radicals and alkenyl radicals of from 1 to 4 carbon atoms, for a time sufficient to cause addition of phosphorous to said modified cellulose polymer.

2. The process of claim 1 in which the trialkyl phosphite is trimethyl phosphite.

3. The process of claim 1 in which the trialkyl phosphite is triethyl phosphite.

4. A process comprising the steps of providing cellulose polymers which have been modified by reaction with a compound having the formula:

$$\text{ROCH}_2\underset{R'}{N}-CO(CH_2)_nX$$

in which R and R' are selected from the group consisting of hydrogen, lower alkyl, hydroxymethyl and alkoxymethyl, X is selected from the group consisting of chlorine, bromine and iodine, and n is an integer in the range of from 1 to 5, to introduce reactive halogen, and reacting the modified cellulose polymers with a reagent selected from a group consisting of ammonia, hydrazine, bis-primary amine and bis-secondary amine, at a temperature between about 125° C. and 175° C. and for a period of time sufficient to cause cross-linking of said modified cellulose polymer through said reagent.

5. The process of claim 4 in which the bis-secondary amine is N,N'-dimethyl ethylene diamine.

6. The process of claim 4 in which the bis-secondary amine is piperazine.

7. A process comprising the steps of providing cellulose polymers which have been modified by reaction with a compound having the formula:

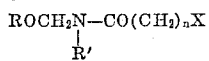

in which R and R' are selected from the group consisting of hydrogen, lower alkyl, hydroxymethyl and alkoxymethyl, X is selected from the group consisting of chlorine, bromine and iodine, and $n$ is an integer in the range of from 1 to 5, to introduce reactive halogen, and treating the modified cellulose with a solution of an alkali salt of a second halide which is more reactive than said reactive halogen, at or above the refluxing temperature of said solution of alkali salt of a second halide, for a time sufficient to substitute said second halide for at least a portion of the said reaction halogen contained in said modified cellulose.

8. A process comprising the steps of providing cellulose polymers which have been modified by reaction with a compound having the formula:

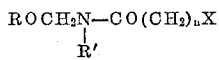

in which R and R' are selected from the group consisting of hydrogen, lower alkyl, hydroxymethyl and alkoxymethyl, X is selected from the group consisting of chlorine, bromine and iodine, and $n$ is an integer in the range of from 1 to 5, to introduce reactive halogen, and reacting the modified cellulose polymers with an amine of the formula:

in which R''' is selected from the group of hydrogen and lower alkyl and Q is a hydrophobic monovalent radical, selected from the group consisting of aliphatic, fluorinated aliphatic and silicon-containing aliphatic radicals at a temperature of between about 125° C. and 175° C. for a period of time sufficient to cause addition of said hydrophobic radical to said modified cellulose polymer.

9. A process comprising the steps of providing cellulose polymers which have been modified by reaction with a compound having the formula:

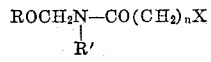

in which R and R' are selected from the group consisting of hydrogen, lower alkyl, hydroxymethyl, and alkoxymethyl, X is selected from the group consisting of chlorine, bromine and iodine, and $n$ is an integer in the range of from 1 to 5, to introduce reactive halogen, and reacting the modified cellulose polymers with a compound of the formula:

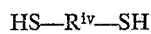

in which $R^{iv}$ is a divalent organic radical, at a temperature of between about 125° C. and 175° C. for a time sufficient to cause cross-linking of said modified cellulose polymers through said reagent.

10. A process comprising the steps of providing cellulose polymers which have been modified by reaction with a compound having the formula:

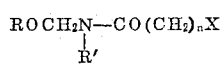

in which R and R' are selected from the group consisting of hydrogen, lower alkyl, hydroxymethyl and alkoxymethyl, X is selected from the group consisting of chlorine, bromine and iodine, and $n$ is an integer in the range of from 1 to 5, to introduce reactive halogen, and reacting the modified cellulose polymers with an alkali metal sulfide, at a temperature above about 100 C. for a time sufficient to cause addition of sulfur to said modified cellulose polymers.

11. The process of claim 10 in which the alkali sulfide is sodium sulfide.

12. A process comprising the steps of providing cellulose polymers which have been modified by reaction with a compound having the formula:

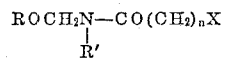

in which R and R' are selected from the group consisting of hydrogen, lower alkyl, hydroxymethyl and alkoxymethyl, X is selected from the group consisting of chlorine, bromine and iodine, and $n$ is an integer in the range of from 1 to 5, to introduce reactive halogen, and reacting the modified cellulose polymers with an alkali disulfide, at a temperature above about 100 C. for a time sufficient to cause addition of sulfur to said modified cellulose polymers.

13. The process of claim 12 in which the alkali disulfide is sodium disulfide.

14. A process comprising the steps of providing cellulose polymers which have been modified by reaction with a compound having the formula:

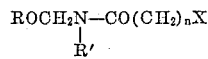

in which R and R' are selected from the group consisting of hydrogen, lower alkyl, hydroxymethyl and alkoxymethyl, X is selected from the group consisting of chlorine, bromine and iodine, and $n$ is an integer in the range of from 1 to 5, to introduce reactive halogen, and reacting the modified cellulose polymers with an alkali metal polysulfide, at a temperature above about 100° C. for a time sufficient to cause addition of sulfur to said modified cellulose polymers.

15. A process comprising the steps of providing cellulose polymers which have been modified by reaction with a compound having the formula:

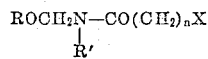

in which R and R' are selected from the group consisting of hydrogen, lower alkyl, hydroxymethyl and alkoxymethyl, X is selected from the group consisting of chlorine, bromine and iodine, and $n$ is an integer in the range of from 1 to 5, to introduce reactive halogen, and reacting the modified cellulose polymers with thiourea, at a temperature of between about 125° C. and 175° C. for a time sufficient to cause addition of sulfur to said modified cellulose polymers.

16. A process comprising the steps of providing cellulose polymers which have been modified by reaction with a compound having the formula:

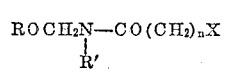

in which R and R' are selected from the group consisting of hydrogen lower alkyl, hydroxymethyl and alkoxymethyl, X is selected from the group consisting of chlorine, bromine and iodine, and $n$ is an integer in the range of from 1 to 5, to introduce reactive halogen, and reacting the modified cellulose polymers with a tertiary amine.

17. A process comprising the steps of providing cellulose polymers which have been modified by reaction with a compound having the formula:

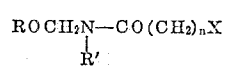

in which R and R' are selected from the group consisting of hydrogen, lower alkyl, hydroxymethyl and alkoxymethyl, X is selected from the group consisting of chlorine, bromine and iodine, and $n$ is an integer in the range of from 1 to 5,
to introduce reactive halogen, and reacting the modified cellulose polymers with a mercaptan of the formula:

$$HS-Q$$

in which Q represents a hydrophobic monovalent radical, at a temperature of between about 125° C. to 175° C. for a time sufficient to cause addition of said hydrophobic radical to said modified cellulose polymers.

No references cited.

DONALD E. CZAJA, *Primary Examiner.*

R. W. MULCAHY, *Assistant Examiner.*